United States Patent
Paradkar et al.

(10) Patent No.: US 8,949,773 B2
(45) Date of Patent: Feb. 3, 2015

(54) DERIVING PROCESS MODELS FROM NATURAL LANGUAGE USE CASE MODELS

(75) Inventors: Amitkumar M. Paradkar, Mohegan Lake, NY (US); Avik Sinha, New Rochelle, NY (US)

(73) Assignee: International Business Machines Corporation, Armonk, NY (US)

( * ) Notice: Subject to any disclaimer, the term of this patent is extended or adjusted under 35 U.S.C. 154(b) by 1126 days.

(21) Appl. No.: 12/731,533

(22) Filed: Mar. 25, 2010

(65) Prior Publication Data

US 2011/0239183 A1    Sep. 29, 2011

(51) Int. Cl.
  *G06F 9/44*     (2006.01)
  *G06Q 10/00*   (2012.01)

(52) U.S. Cl.
  CPC ... *G06F 8/10* (2013.01); *G06F 8/34* (2013.01)
  USPC ........... 717/104; 717/101; 717/105; 717/106; 705/7.13; 705/7.27

(58) Field of Classification Search
  None
  See application file for complete search history.

(56) References Cited

U.S. PATENT DOCUMENTS

| | | | |
|---|---|---|---|
| 5,966,686 A * | 10/1999 | Heidorn et al. | 704/9 |
| 6,023,578 A * | 2/2000 | Birsan et al. | 717/105 |
| 6,173,440 B1 * | 1/2001 | Darty | 717/130 |
| 6,950,802 B1 * | 9/2005 | Barnes et al. | 705/7.22 |
| 7,346,888 B1 * | 3/2008 | Srinivasan et al. | 717/105 |
| 7,555,742 B2 * | 6/2009 | Iborra et al. | 717/101 |
| 7,752,608 B1 * | 7/2010 | Hinchey et al. | 717/136 |
| 2003/0195789 A1 * | 10/2003 | Yen | 705/9 |
| 2004/0181390 A1 * | 9/2004 | Manson | 704/2 |
| 2005/0091093 A1 * | 4/2005 | Bhaskaran et al. | 705/7 |
| 2007/0074182 A1 * | 3/2007 | Hinchey et al. | 717/136 |
| 2007/0168922 A1 * | 7/2007 | Kaiser | 717/104 |
| 2008/0184196 A1 * | 7/2008 | Kataoka | 717/107 |
| 2008/0263506 A1 * | 10/2008 | Broadfoot et al. | 717/104 |
| 2008/0270196 A1 * | 10/2008 | Yaegashi | 705/7 |
| 2008/0313599 A1 * | 12/2008 | Carteri et al. | 717/104 |
| 2009/0177508 A1 * | 7/2009 | Leung | 705/7 |
| 2009/0178021 A1 * | 7/2009 | Alluri | 717/104 |
| 2010/0057482 A1 * | 3/2010 | Radhakrishnan et al. | 705/1 |
| 2012/0011487 A1 * | 1/2012 | Matsumoto | 717/104 |
| 2013/0198713 A1 * | 8/2013 | Zhang et al. | 717/106 |

OTHER PUBLICATIONS

Fabian Friedrich ei al., "Process Model Generation from Natural Language Text", [Online], 2011, pp. 482-496, [Retrieved from Interent on Sep. 18, 2014], <http://t.mendling.com/publications/11-CAISE-Generate-Process.pdf>.*

(Continued)

*Primary Examiner* — Thuy Dao
*Assistant Examiner* — Ziaul A Chowdhury
(74) *Attorney, Agent, or Firm* — Scully, Scott, Murphy & Presser, P.C.; Louis J. Percello, Esq.

(57) ABSTRACT

One or more process models from natural language use case models are derived, for example, by creating, using a processor, an in-memory model of a use case from information in natural language text describing the use case; transforming the in-memory model into a process model in predetermined modeling notation; and generating a selected business process model using the process model.

24 Claims, 6 Drawing Sheets

(56) References Cited

OTHER PUBLICATIONS

Avik Sinha et al. "A Linguistic Analysis Engine for Natural Language Use Case Description and Its Application to Dependability Analysis in Industrial Use Cases", [Online], 2009, pp. 327-336, [Retrieved from Internet on Sep. 18, 2014], <http://ieeexplore.ieee.org/stamp/stamp.jsp?tp=&arnumber=5270320>.*

Simon Johnston et al., "Rational UML Profile for Business Modeling", [Online], IBM 2004, pp. 1-21, [Retrieved from Internet on Sep. 18, 2014], <http://www.michael-richardson.com/rup_classic/extend.bus_model/guidances/whitepapers/resources/bmprofile.pdf>.*

A.Fantechi et al. "Application of Linguistic Techniques for Use Case Analysis", [Online],Springer 2003, pp. 1-8, [Retrieved from Internet on Sep. 18, 2014], <http://shining.isti.cnr.it/WEBPAPER/RE02-revfin.PDF>.*

Boguraev, B., Towards finite-state analysis of lexical cohesion, In 3rd International Conference on Finite-State Methods for NLP, Liege, Belgium, 2000.

Briand, L. C. et al.,, A uml-based approach to system testing, In UML' '01: Proceedings of the 4th International Conference on the Unified Modeling Language, Modeling Languages, Concepts, and Tools, 2001, pp. 194-208, London, UK, Springer-Verlag.

Cockburn, A., Writing Effective Use Cases, The Crystal Collection for Software Professionals, 2000, Addison-Wesley, MA, USA, http://www.amazon.com/Writing-Effective-Cases-Alistair-Cockburn/dp/0201702258.

Ferrucci, D. et al., UIMA: an architectural approach to unstructured information processing in the corporate research environment, Natural Language Engineering, 2004, 10(4), http://portal.acm.org/citation.cfm?id=1030318.1030325.

Gutierrez, J. J., et al., Visualization of use cases through automatically generated activity diagrams, In MoDELS '08: Proceedings of the 11th international conference on Model Driven Engineering Languages and Systems, 2008, pp. 83-96, Berlin, Heidelberg, Springer-Verlag.

Lubke, D., Transformation of use cases to epc models. In EPK, 2006, pp. 137-156.

Lubke, D., et al., Visualizing use case sets as bpmn processes, Sep. 2008, pp. 21-25.

Lutz, R., Analyzing software requirements errors in safety-critical, embedded systems. In RE'93, 1993.

Ntafos, S. C., et al., On path cover problems in digraphs and applications to program testing. IEEE Trans. Softw. Eng., 1979, 5(5):520-529, http://www.computer.org/portal/web/csdl/doi/10.1109/TSE.1979.234213.

OMG. Business process modeling notation version 1.1., 2008, Object Management Group, http://www.bpmn.org/Documents/BPMN1-1Specification.pdf.

Sinha, A., et al., A linguistic analysis engine for natural language use case description and its application to dependability analysis in industrial use cases, In DSN '09, 2009, pages accepted—to appear in proceedings.

White, S. A., Introduction to BPMN. Online, 2004. http://www.bpmn.org/Documents/Introduction%20to%20BPMN.pdf.

Zhang, T., et al., Text chunking based on a generalization of Winnow. Jnl. of Machine Learning Research, 2002, 2: 615-637.

* cited by examiner

DERIVING PROCESS MODELS FROM NATURAL LANGUAGE USE CASE MODELS

FIELD

The present application generally relates to process modeling, and more particularly to deriving process models from natural language use case specifications.

BACKGROUND

Use cases are used to elicit software requirements from the point of view of the user of a system. Their prevalence in requirement specification has been noticeable ever since the onset of agile programming techniques. Within Service-Oriented Architecture (SOA) projects however, business process models are used for capability analysis and gap detection. Business process models present a global view of the system and hence are more suited for gap detection. Therefore, in practice both these forms of requirements continue to be useful and coexist. Often in big software projects and in distributed development environment such coexisting requirement specifications can grow out of synch. Out of synch requirement specifications can be a major source of requirement errors that lead to, eventually, catastrophic software failures.

A few approaches to the translation of business use cases to a graphical notation such Business Process Modeling Notation (BPMN), Event-driven Process Chain (EPC) or Unified Modeling Language (UML) Activity Diagrams have been reported. Gutierrez et al. describe an approach in J. J. Gutierrez, C. Nebut, M. J. Escalona, M. Mej'ias, and I. M. Ramos., Visualization of use cases through automatically generated activity diagrams, In MoDELS '08: Proceedings of the 11th international conference on Model Driven Engineering Languages and Systems, pages 83-96, Berlin, Heidelberg, 2008, Springer-Verlag. Their process accepts use cases defined using an existing template and translates the various concepts in the use case domain to relevant concepts in UML activity diagrams. This approach is essentially a one-to-one mapping between the use case template and an activity diagram. The approach does not produce an end-to-end business scenario. In this approach, each step defined in a use case flow is transformed into an activity in a diagram using the complete text as a label.

Lubke describes another approach in D. Lubke, "Transformation of use cases to epc models", In EPK, pages 137-156, 2006, and in D. Lubke, K. Schneider, and M. Weidlich, "Visualizing use case sets as bpmn processes", pages 21-25, September 2008. This method translates a use case defined in an existing template into an EPC representation (Event Process Chains). Similar to the previous approach by Gutierrez, this approach consists of a one-to-one mapping between a various elements of predefined use case templates to the relevant elements of EPC. The author uses the pre- and post-conditions defined as textual strings to derive an end-to-end scenario. The author (with other colleagues) has used the same approach to generate BPMN models from use case descriptions.

All these approaches do not analyze the use case text to extract any semantic information and also rely on literal string matching to perform end-to-end scenario creation. This could lead to several usability errors in the form of cluttered diagrams and lack of flexibility for the business analyst in terms of describing the use case content. Further, an approach based on using pre- and post-conditions on use cases indicates end-to-end scenarios which are feasible but may lead to scenarios which are not desired by a business analyst.

BRIEF SUMMARY

A method and system for deriving one or more process models from natural language use case specifications are provided. The method, in one aspect, may include creating an in-memory model of a use case from information in natural language text describing the use case, transforming the in-memory model into a process model in predetermined modeling notation, and generating a business process model representing an end to end business scenario using the process model.

A system for deriving one or more process models from natural language use case models, in one aspect, may include a processor operable to create an in-memory model of a use case from information in natural language text describing the use case. The processor further may be operable to transform the in-memory model into a process model in predetermined modeling notation. The processor also may be operable to generate a selected business process model using the process model. A user interface module may be operable to guide a user to create the in-memory model, generate the selected business process model, edit the natural language text, and edit the selected business process model and edit the in-memory model.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

In one aspect, a technique is provided to semi-automatically transform use cases into business processes and to create one or more mappings between them. By preserving the mapping between these forms one can enforce consistency between the two forms of requirements, for example, in the presence of updates to either the textual description or the derived BPMN representation.

The transformation of textual use cases to Business Process Modeling Notation (BPMN) models may include the following steps:

Processing the Natural Language Use Case: During this step the use case in Natural Language is parsed and the information in the text is used to create an in-memory model of the use case.

Deriving a process model for use case: During this step the in-memory model of the use case is transformed into a process model in BPMN.

Generating Business Process Model from Use Cases: This step combines multiple process models to derive the desired business process model.

Natural Language Processing

An example technique to process textual use cases is described in A. Sinha, A. Paradkar, P. Kumanan, and B. Boguraev, "A linguistic analysis engine for natural language use case description and its application to dependability analysis in industrial use cases", In DSN '09, Jun. 29-Jul. 2, 2009, pp 327-336, which is incorporated herein by reference in its entirety. A linguistic analysis engine (LE) extracts information from natural language use case text to create an in-memory computer model, which herein is referred to as "Application Model."

Figure 1:
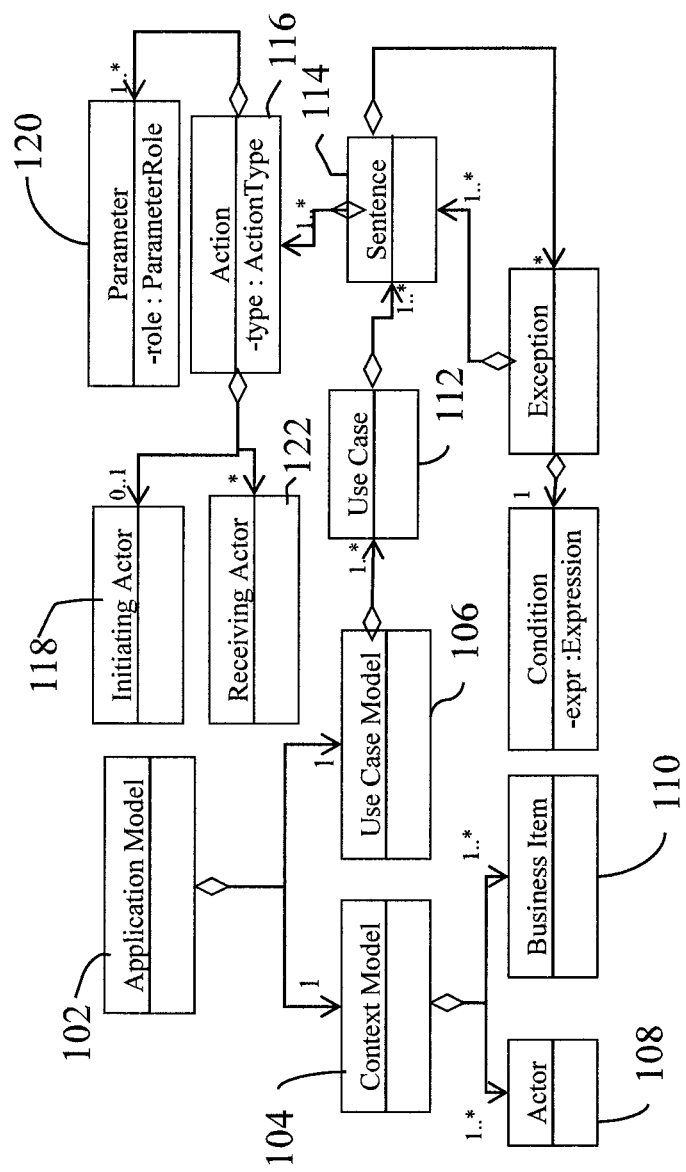
FIG. 1 illustrates the meta-model of an "Application Model" in one embodiment of the present disclosure.

FIG. 1 illustrates the meta-model of an "Application Model" in one embodiment of the present disclosure. At the top abstract level, an application model 102 may include a model of the context 104 and a model of use cases 106. The context model 104 contains a description of kinds of actors 108 and business items 110. Each use 112 case in the use case model 106 contains a list of sentences 114. The sentences, in turn, contain one or more actions 116 initiated by some actor 118 of a kind described in the context model 104. An action 116 may also have a set of parameters 120 and can be associated to one or more actors 122 (also of a kind described in the context model) who receive the effect of the action. In addition, each action 116 has a type and each parameter 120 has one or more roles.

While the type of action determines its classification, the role determines the relation of the parameter with respect to the action. The permitted action types may include: INPUT, the act of providing information; OUTPUT, the act of receiving information; CREATE, the act of creating an entity; QUERY, the act of searching for an existing entity; UPDATE, the act of updating the state of an entity; DELETE, the act of deleting an entity; DIRECT, the act of directing another actor to perform an action; INITIATE, the act of initiating another use cases; and ACCESSCHANGE, the act of gaining read/update access to entities Roles of a parameter may include: ARGUMENT, the main argument of an action; HELPER, the parameter helping an action; PURPOSE, the objective of an action; etc. Some parameters can be linked to one of the business items defined in the context model. A statement in use case action can also be linked to zero or more exceptions. Each exception is guarded by a condition and contains a list of actions that replace actions in the parent statement if the guarding condition is true (at runtime), i.e., the exception occurs or is satisfied.

Figure 2:
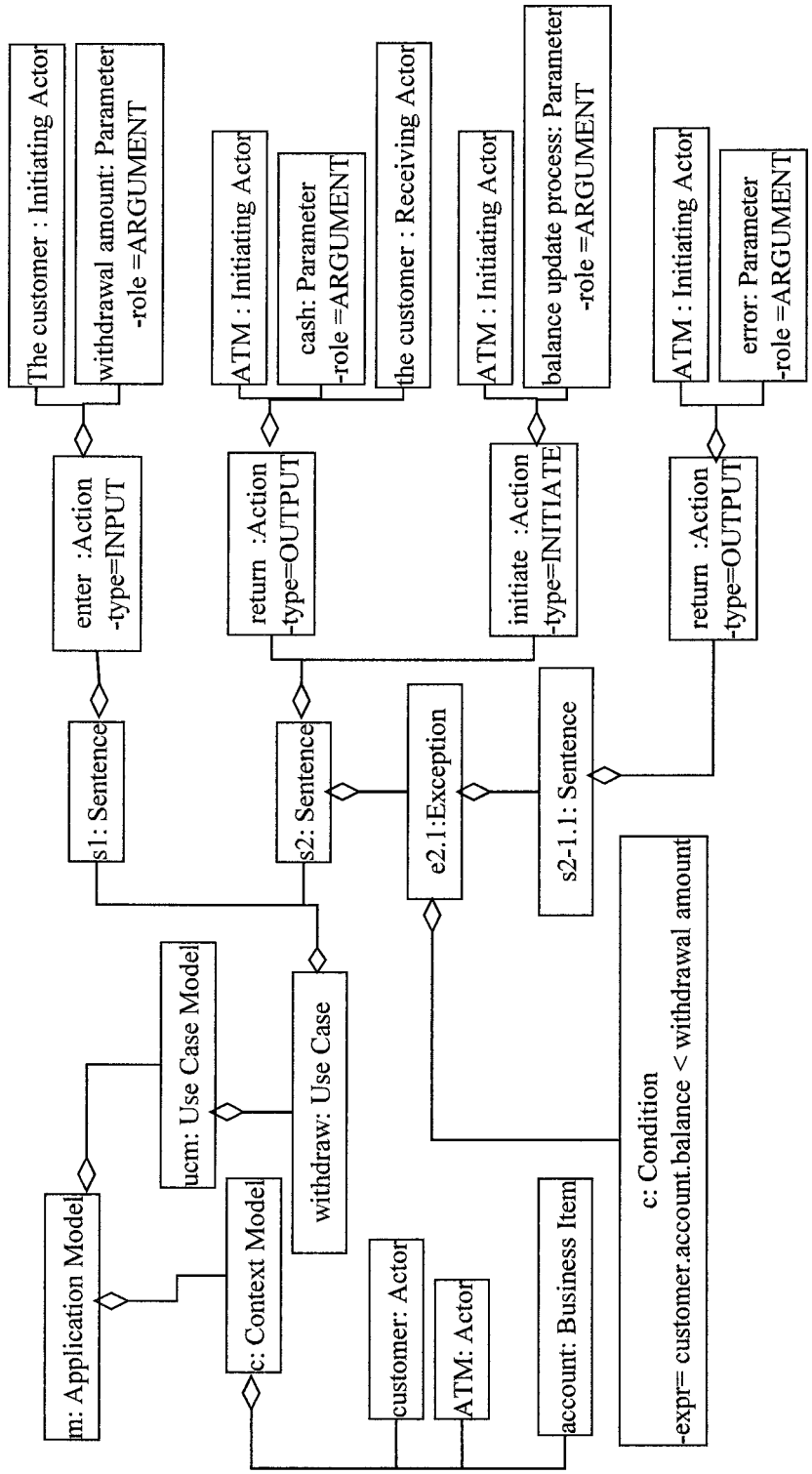
FIG. 2 illustrates an example application model.

Consider a snippet of a natural language (NL) use case "Withdraw Money": The customer enters the withdrawal amount. The automated teller machine (ATM) returns cash to the customer and changes his account balance. If the balance on customer's account is less than the withdrawal amount, the ATM returns an error. On analysis the LE creates the application model as shown in FIG. 2. The LE may be implemented as a pipeline of multiple configurable components integrated using the Unstructured Information Management Architecture (UIMA). The syntactic analysis for the LE may be achieved by means of a shallow parser. Unlike deep parsers, shallow parsers do not attempt to parse the entire text and, instead, they scan the text, on the surface, for known phrasal patterns. Such parsers yield very high accuracies in parsing text where the sentence structures do not vary widely. The text in natural language use case descriptions does not, ideally, vary widely with regards to structure and therefore, the LE has a very high accuracy.

Additionally, the LE deploys a lexical processor, a component that tokenizes the text, assigns base form to the words and associates part of speech (POS) information to tokens. The lexical processor need not be trained on a specific corpus, instead it may use the robust risk minimization (RRM) technology. The RRM technology embodies lexical knowledge not only of "unconstrained" English but also for over a hundred other languages (including German, French, Spanish, Italian, Russian and Chinese). This greatly facilitates adaptation of the LE to different languages and its applicability to multiple application domains. Use cases can be used to describe applications from a variety of domains including and not limited to health care, aviation, finance, networking and services. By using the RRM technology, the LE is not restricted only to a very specific set of words for correct lexical processing. However, certain domain specific analysis activities may need greater accuracy. UIMA also helps in retargeting the currently domain independent LE to a domain specific text. For instance, retargeting the lexical analysis to a health-care-domain use case can be easily accomplished by configuring the LE by swapping in a medical text-aware lexical processor.

Process Model of Use Cases

Figure 3:
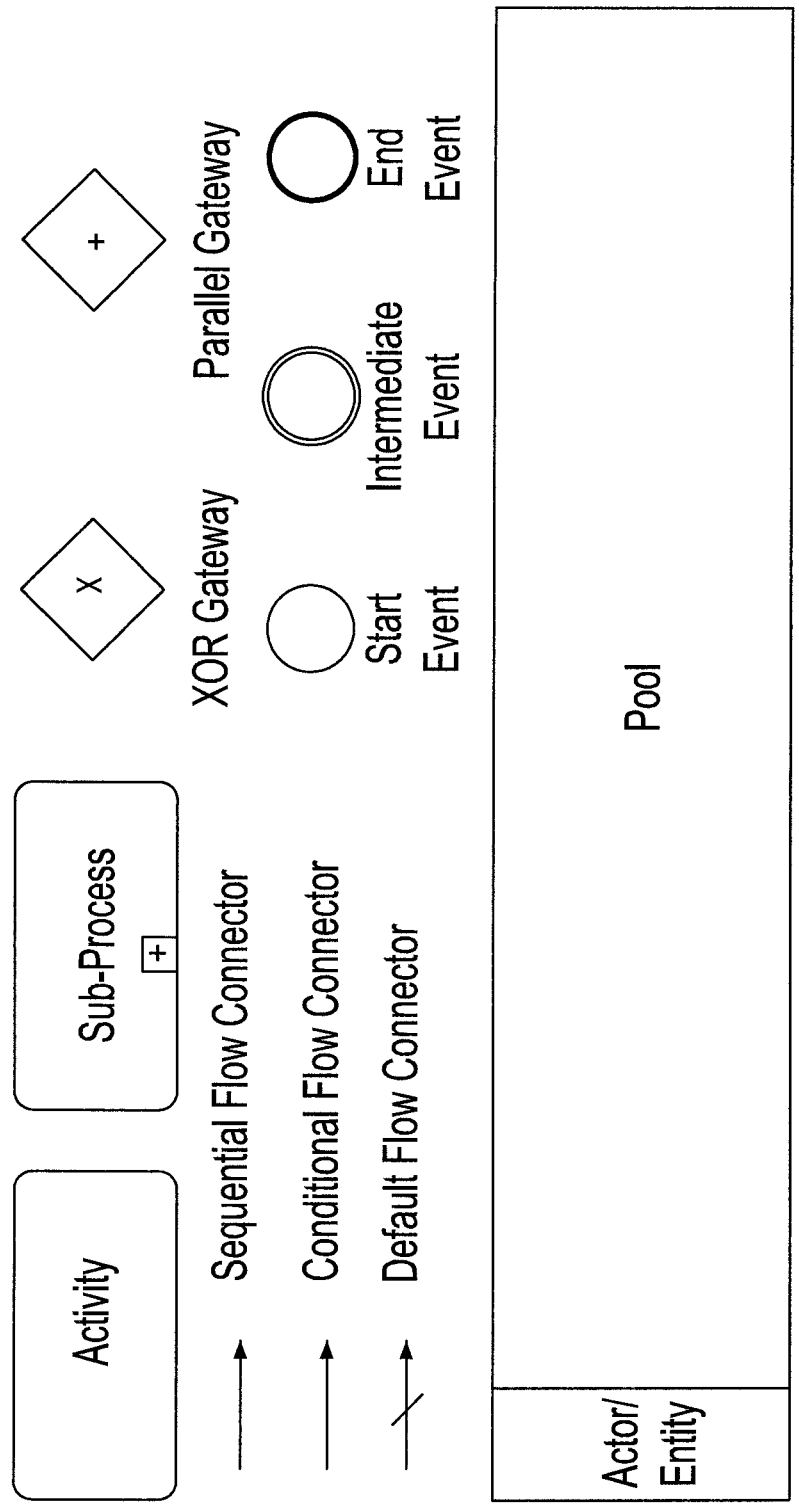
FIG. 3 shows subset of BPMN used for use case process models.

Process model of use cases are described using a subset of standard BPMN graphical elements as shown in FIG. 3. Semantics of the graphical notations are described in S. A. White, Introduction to BPMN, 2004 at "http://www.bpmn.org/Documents/Introduction %20to%20BPMN.pdf."

The transformation of in-memory model of a use case to processes in BPMN starts by creating an empty pool $\rho_\alpha$ for each actor $\alpha$ in a use case u. The process model of a use case process has one START event and has one or more END events. The START event is created in the pool $\rho_\alpha$ representing the initiating actor of the first action in the use case.

The flow of activities in the process diagram is populated by processing each sentence of a use case in sequence. Algorithm 1 describes a transformation algorithm as applied to a use case sentence. The algorithm prerequisites the process model to be initialized with a START event, as is described in the preceding paragraph. Depending on the type of the action in a use case an ACTIVITY or a SUB-PROCESS is created. The connectors are created in accordance with the implied sequence of actions in the use case. The final ACTIVITY/SUB-PROCESS of a process model is eventually linked to an END event. The exceptions for in use case sentences are transformed into GATEWAY-s of a process model.

---

Algorithm 1 transform (Use Case Sentence s)

Require: A process diagram initialized with pools corresponding to actors of use case u and a START event.

Ensure: $\forall$ action a $\in$ u, a.type $\neq$ UNCLASSIFIED.

```
 1: source ← START
 2: for all Action a ∈ s do
 3:     find pool ρ_α such that a.InitiatingActor = α .
 4:     if a.Type = INITIATE then
 5:         Add a SUB-PROCESS p_a in pool ρ_α
 6:         Create a SEQUENCE FLOW connector from source
            to p_a
 7:         source ← p_a
 8:     else
 9:         Add an ACTIVITY a_a in pool ρ_α
10:         Create a SEQUENCE FLOW connector from source
            to a_a
11:         source ← a_a
12:     end if
```

-continued

```
13: end for
14: for all Exception e ∈ s do
15:     transform(e)
16: end for
17: Terminate all dangling flows with END event.
```

---

```
Algorithm 2 transform (Exception e)
Ensure: ∀ action a ∈ e, a.type ≠ UNCLASSIFIED.
 1: Create GATEWAY g_e in the pool containing source
 2: Create a SEQUENCE FLOW connector from source to g_e
 3: source ← g_e
 4: for all Sentence s ∈ e do
 5:     transform(s).
 6: end for
 7: if e.TerminationType = ABNORMAL then
 8:     Create an END event e_e in the pool containing source
 9:     Create a SEQUENCE FLOW connector from source to e_e
10:     source ← g_e
11: else
12:     Create a SEQUENCE FLOW connector from source to g_e
13:     source ← g_e
14: end if
```

Figure 4:
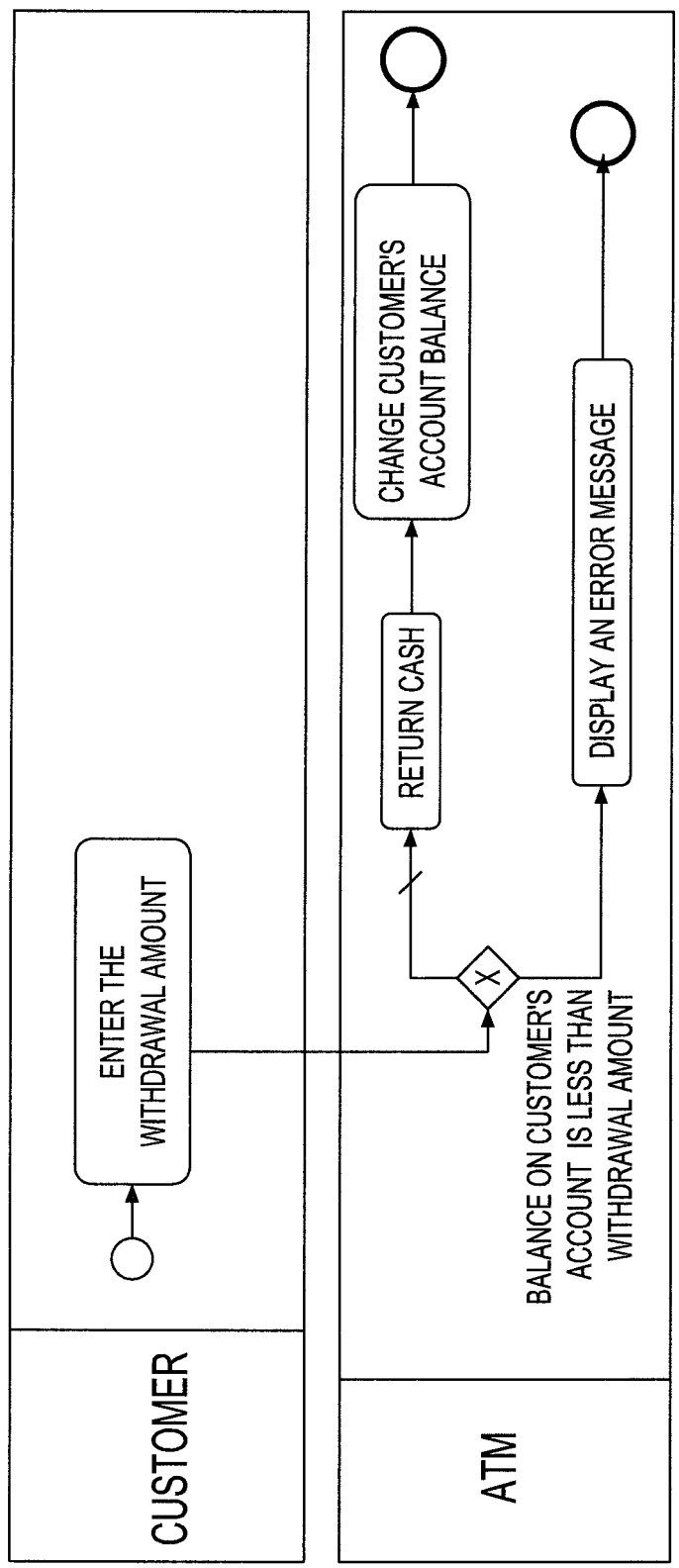
FIG. 4 illustrates an example of a process model.

Algorithm 2 describes the process of transforming exceptions associated with use case sentences. The exceptions can have two kinds of termination type: Normal and Abnormal. The abnormal termination implies that the exception flow ends after executing statements in the exception blocks. The normal termination, on the other hand, implies that the flow resumes operation at the statement just after the parent statement for the exception. This is reflected in lines 7-14 of Algorithm 2. The differentiation between the two termination types may be done by the natural language processing (NLP) processing engine. Exception statement blocks that return failure messages or have explicit terminate messages may be considered to have abnormal termination. All other exception blocks are by default assigned normal termination. For the example snippet described above the process model described as derived through the transformation process is shown in FIG. 4.

Generation of Business Processes

The transformation of use case to process models as described above produces a process model for each use case. Such a process model can be uniquely represented by a quintuple $P_u = \{Pool_u; start_u; End_u; Connector_u; Node_u\}$, where $Pool_u$ is the set of pools, $start_u$ is the only start event, $End_u$ is the set of end events, $Connector_u$ is the set of all connectors and $Node_u$ is the set of all activity nodes, sub-processes nodes and gates in $P_u$. Business processes may be derived by composing such process models of one or more use cases. For example, consider a set of use cases related to a banking system: "Admin Log in", "Customer log in", "Create Account", "Find Account", "Deposit Money", "Withdraw money", "Log off", etc. An end to end business process of "Create to Deposit" can be realized by stringing the use cases in a sequence of ["Admin Log in", "Create Account", "Deposit Money", "Log off"].

Figure 5:
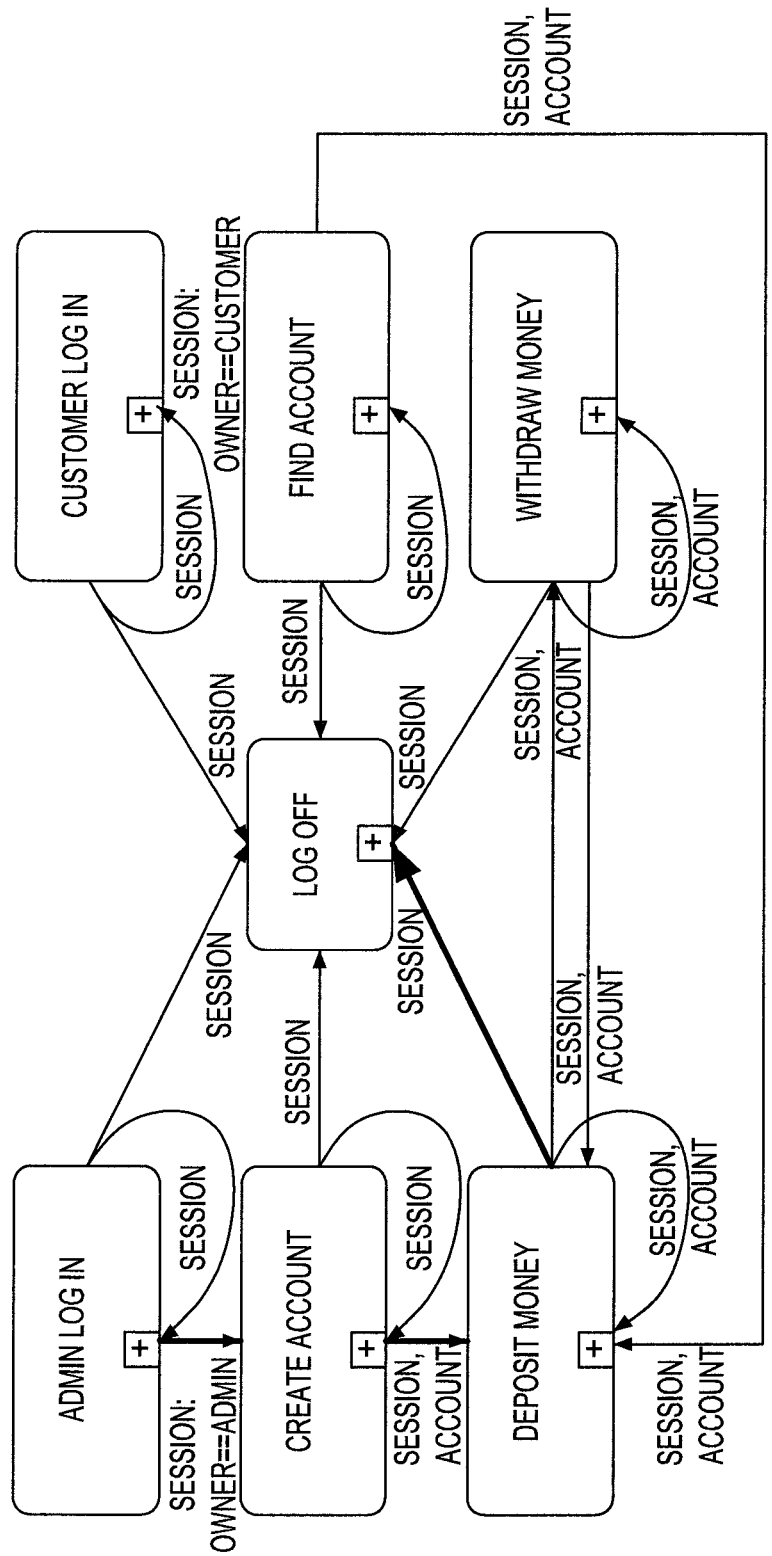
FIG. 5 illustrates def-use graph of example use cases.

One way to generate such sequences is by def-use analysis of execution paths of use case process models. An execution path through a use case process model is the path of stringing activities and sub-processes from the start event to any end event. The def-use analysis creates a def-use graph by connecting a use case process model containing an execution path where an object is defined (created or updated) to a use case process model containing a path where the object is used (read, queried, deleted or used). The edges of a def-use graph are annotated with the objects being used at its target. For example for use cases of the banking system the def-use graph may be computed as shown in FIG. 5. The "Admin Log in" process model has a path that creates (defines) a session, which is used by a path in "Create Account" to create a customer account. If "Admin Log in" fails for the first time, an execution path signifying the event "retry" can use the already defined session. Also, a path in the "Deposit Money" uses a session and a customer account. Also, a path in "Log off" uses a session. By computing all such def-use pairs the def-use graph may be computed. Note that in order to differentiate between a session created through "Admin log in" versus "Customer log in", the precondition and postcondition on paths may be analyzed. Therefore, the def-use graph may be annotated by the enabling conditions. Such conditions are derived by parsing the condition on BPMN gateways. A path in this graph that runs through a sequence of use case processes can be said to realize a business functionality. For instance, the business functionality of "Create to Deposit" as described in the preceding paragraph can be automatically derived by computing the path highlighted with dark lines in FIG. 5.

To ascertain if the resultant sequence of process models indeed serves the purpose of the desired business process, the business analyst may be requested to describe the purpose of the desired business process in enough detail, e.g., in terms of a logical expression so that a pre-condition and/or post-condition analysis can be used to verify the fitness of a sequence. Another approach is to produce all possible sequences of use case processes and let the business analyst choose the desired sequence. Heuristics rules may be used to prune the option space—such as not allowing more than one pass through a loop or not allowing multiple definitions of an object.

The present disclosure provides a semi-automatic procedure. For example, a platform (e.g., application software running on top of a computer operating system, a combination of firmware and software, or others) may be provided wherein the business analyst can combine process model of use cases manually with automated guidance. The platform provides on a palette the use case process models and connectors between them. Business analyst can drag and drop these process models on a canvas and connect them through connectors. The platform may support the following connectors: SEQUENTIAL, PARALLEL and GATED. The platform may be supported by a guidance tool that computes and presents automatically the possible paths through the selected process models as possibilities. The business analyst can then delete the paths he or she is not interested in or alternately mark the path he or she is interested in. This process may be interactive and incremental. When a new use case process is added to the already existing set, the possibility set may be pruned and sorted by eliminating paths that do not go along with the analyst's manual pruning and by giving priority to paths consistent with def-use analysis. For instance, consider a scenario where the banking system analyst has chosen a path through "Customer Log in". This implies to the tool that a session exists such that session:owner=customer 1. Since the only paths that remain valid at that point are those through "Find account" and "Log off", the tool may remove other use case process models from the palette, effectively blocking from the analyst's consideration.

Consolidation of Process Model

The chaining of use cases may be affected by a business analyst selectively adding the requisite use cases. Once a combination is chosen by a business process designer, a consolidated process model may be produced. The following multiple operators are defined for composing process models of use cases:

Sequential Add: A sequential add (denoted by operator ++) of process models is defined as strict sequencing of activities. This operator may be invoked to consolidate processes connected by SEQUENTIAL connectors. Process model $P_a$ and $P_b$ on sequential add is equivalent to a process model $P_{seq}$ such that $P_{seq}=P_a++P_b$ and $Pool_{seq}=Pool_a \cup Pool_b$, $Node_{seq}=Node_a \cup Node_b$, $start_{seq}=start_b$ and $End_{seq}=End_b$. Further, for all connectors to events in End$_a$ are modified to connect to events that are connected from start$_b$.

Parallel Add: A parallel add (denoted by the operator ||) of process models is defined as strict paralleling of start and end of use case processes. This operator may be invoked to consolidate processes connected by PARALLEL connectors. Process model $P_a$ and $P_b$ on parallel add is equivalent to a process model $P_{par}$ such that $P_{par}=P_a \| P_b$ and $Pool_{par}=Pool_a \cup Pool_b$, $Node_{par}=Node_a \cup Node_b$ and $End_{par}=End_a \cup End_b$. A start event start$_{par}$ denotes the parallel start of events in $P_a$ and $P_b$.

Gated Add: A gated add of two processes of process models may be invoked following composition of two processes through either a BPMN XOR gateway (denoted by ◇ XOR) or a BPMN parallel gateway (denoted by ◇ Parallel). In gated add the process are composed using BPMN gateways. For example if process model $P_a$ is combined to $P_b$ using an XOR gate to effect a business process model PXOR, $P_{XOR}=P_a \diamondsuit_{XOR} P_b$, such that $Pool_{XOR}=Pool_a \cup Pool_b$, $Node_{XOR}=Node_a \cup Node_b \cup G_{XOR}$, $start_{XOR}=start_b$ and $End_{XOR}=End_b$. $G_{XOR}$ denotes the set of additional gateways introduced during the gated add. Each gateway in $G_{XOR}$ in effect replaces End$_a$ and start$_b$.

Following the consolidation process the redundant events may be eliminated and redundant activities combined. This process reduces the size of the BPMN process model. To eliminate and spot redundancies the following definitions are used:

Redundant activity: Two or more activities are defined to be redundant if they appear in the same pool in sequence and they represent use case actions of the same type. A sequence of redundant activities $a_1, \ldots, a_n$ can be replaced by an activity a such that a represents an action of the same type and the parameter set of the action represented by a is defined as $p=p_1 \cup \ldots p_n$ where $p_i$ represents the parameter set of action represented by i-th redundant activity.

Redundant connector: Each connector in a process model can be uniquely represented by an attribute set of {type, from, to, condition}. Two or more connectors are defined to be redundant if they have the same type (i.e., sequential or message flow), same from and to nodes and equivalent conditions. Two condition c1 and c2 sets are said to be equivalent if c1•¬c2 ≡ c2•¬c1 ≡ FALSE. A set of redundant connectors can be replaced by a single connector with the same type, from and to attributes. The condition on the replacement connector is defined as $c=c_1 \bullet \ldots c_n$, where $c_i$ is the condition on i-th redundant connector.

Redundant events: Any two consecutive events that share a pool may be considered redundant for the purposes of consolidation of use case process models. Redundant events may be removed during consolidation and the connectors may be subsequently adjusted.

Reverse transformation and Consistency Analysis

The use case editing and transformation to business processes may be implemented as a unified platform for requirement elicitation. The platform may provide following features, although not limited to only the following:

Functionality for identifying use cases and creating use case diagrams.

Functionality for elaborating details of use cases.

Functionality for transforming textual use cases into process models.

Provide feedback on correctness of use case process models.

Functionality to assist in combination of process models.

In requirement elicitation, the business analyst (or another personnel with similar responsibilities) may start by creating and elaborating use cases. On each save of the use case a computer model of use case is generated. The computer model is transformed into a process model of the use case and is presented to the business analyst. The business analyst may edit the process model to his liking or may directly edit the text of the use case. Once satisfied with the use case process model, he may start combining them using the palette and the combination tool to produce the consolidated business process model. Once a consolidated business process model is produced it is constantly supervised for consistency. Any change in the use case model or the consolidated business model triggers a consistency analysis. Errors, if found, may be reported on both use case model and the business process model.

Reverse Transformation

The edits to process model of use cases may be transformed to edits to the textual use case. Such edits are used to preserve consistency between the two forms of the use case. Following is a list of various reverse transforms corresponding to edits of the process model:

Adding an activity or a sub-process is transformed into creation of an action in the text. The form of the sentence is generated according to the template: Initiating Actor performs activity or Initiating Actor initiates subprocess. The "initiating actor" information is populated from the name of the pool that contains the created element. This sentence is then subjected to NLP via the LE to extract other features or the action such as its type and parameters.

Adding a Gateway is transformed into creation of an exception in the text. Parallel gateways result in a sibling exception and XOR gateways result in nested exception. The form of the sentence is generated according to the template: If condition, Initiating Actor performs activity. The information for populating "condition" is obtained from the condition on the edge.

Deleting an action is transformed into deletion of the action from the text. If the action is part of a compound sentence (a sentence containing two or more actions) then the compound sentence is replaced by sentences representing other actions (using the template specified above).

Deleting a gateway is transformed into deletion of the exception. The activities following the gate that correspond to the exception sentences are merged into the main flow.

Renaming an element involves renaming all instances of the entity in the text.

Consistency Evaluation

Editing of a use case model or editing the consolidated business process can make the end to end business process inconsistent to the use case descriptions. For instance, the text of the use case can be modified in a way that the resulting def-use graph may not allow sequencing of the process models suggested by the consolidated process. To detect such inconsistencies, whenever the text of the use case is edited, process models are re-generated and are subjected to def-use analysis. The consolidation method described above preserves the as-is sequencing of the use cases. If the as-is sequencing conflicts with the newly generated def-use graph, a consistency violation is recorded.

In an event when the consolidated business process is edited directly, reverse transformations are computed to perform the edits on the text. The new use case text is then re-processed and similar consistency analysis is performed.

Use of use cases to model requirements supports iterative development and increased customer participation. While textual representations are easy to produce and edit, they may not provide as strong a communication tool as graphical models. A visual representation of such textual information is helpful during the review process. Emerging standards such as Business Process Modeling Notation (BPMN) are conducive for visually representing the business process flows. Therefore, an approach which translates textual business use case descriptions into a visual BPMN notation would be valuable to the practitioners. This will also help maintain consistency between the user centric requirement descriptions in use cases and the process centric (and possibly global) model specifications in BPMN. Additionally, with the built-in mapping between BPMN and Web Services Business Process Execution Language (WS-BPEL), the derived BPMN processes can be input to a Business Process Execution Language (BPEL) execution engine after appropriate augmentation of the BPEL descriptions.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 6:
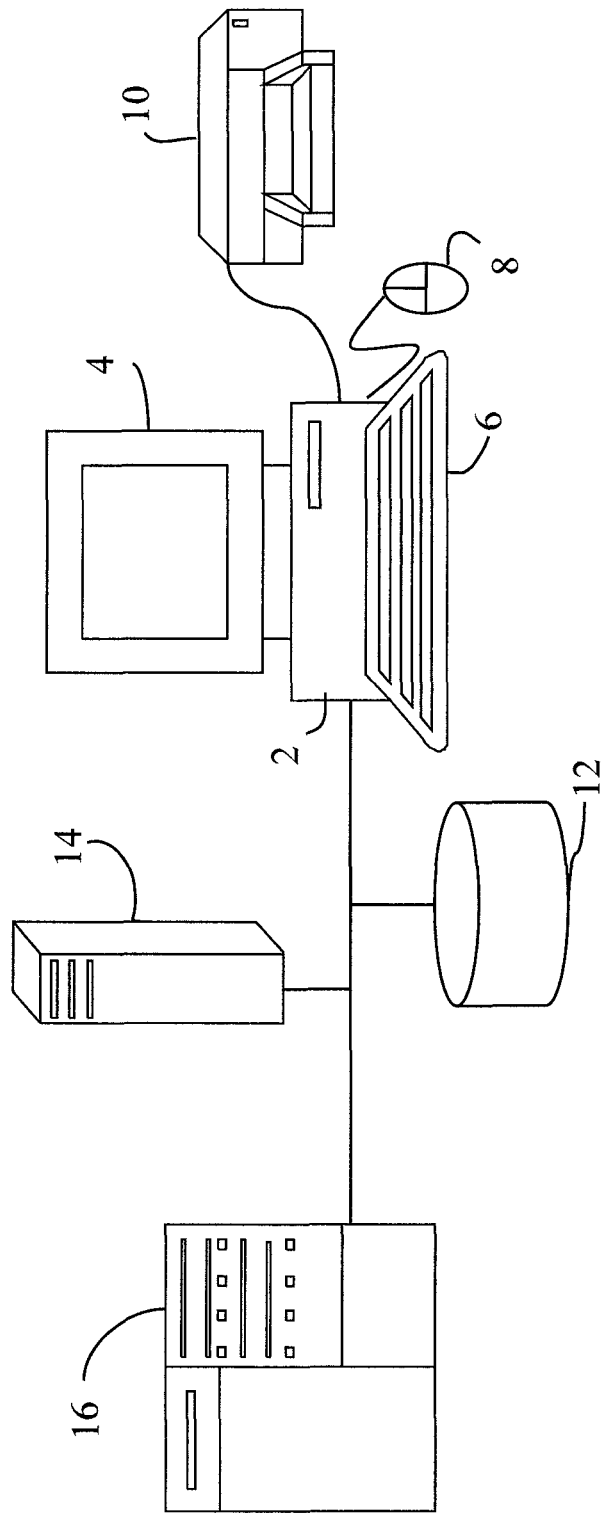
FIG. 6 illustrates an example of a computer system, in which the systems and methodologies of the present disclosure may be carried out or executed.

Referring now to FIG. 6, the systems and methodologies of the present disclosure may be carried out or executed in a computer system that includes a processing unit 2, which houses one or more processors and/or cores, memory and other systems components (not shown expressly in the drawing) that implement a computer processing system, or computer that may execute a computer program product. The computer program product may comprise media, for example a hard disk, a compact storage medium such as a compact disc, or other storage devices, which may be read by the processing unit 2 by any techniques known or will be known to the skilled artisan for providing the computer program product to the processing system for execution.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The computer processing system that carries out the system and method of the present disclosure may also include a display device such as a monitor or display screen 4 for presenting output displays and providing a display through which the user may input data and interact with the processing system, for instance, in cooperation with input devices such as the keyboard 6 and mouse device 8 or pointing device. The computer processing system may be also connected or coupled to one or more peripheral devices such as the printer 10, scanner (not shown), speaker, and any other devices, directly or via remote connections. The computer processing system may be connected or coupled to one or more other processing systems such as a server 10, other remote computer processing system 14, network storage devices 12, via any one or more of a local Ethernet, WAN connection, Internet, etc. or via any other networking methodologies that connect different computing systems and allow them to communicate with one another. The various functionalities and modules of the systems and methods of the present disclosure may be implemented or carried out distributedly on different processing systems (e.g., 2, 14, 16), or on any single platform, for instance, accessing data stored locally or distributedly on the network.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

The invention claimed is:

1. A computer-implemented method for deriving one or more process models from natural language use case specifications, comprising:
   creating an in-memory model of a use case from information in natural language text describing the use case, wherein the in-memory model comprises at least an actor node and one or more action nodes comprising an action initiated at least by the actor node, wherein the action of the one or more action nodes has a type comprising at least one of input, output, create, query, update, delete, direct, initiate, and access change, the method further comprising transforming the in-memory model into a process model in predetermined modeling notation, wherein the process model comprises at least a start node, an activity node, and a sub-process node, and the method further comprising generating a selected business process model using the process model; and guiding a user to create the in-memory model, generate the selected business process model, edit the natural language text, and edit the selected business process model and edit the in-memory model; and in response to detecting an addition of a gateway in the generated business process model, the method further comprising automatically transforming the addition into creation of an exception in the natural language text of the use case of the in-memory model, wherein in response to detecting a change in at least the process model, the method further comprising triggering a consistency check among the natural language text of the use case, the in-memory model, the end-to-end business process model, and the changed process model.

2. The method of claim 1, wherein a plurality of process models are transformed from a plurality of in-memory models, and the generation of business process model includes selectively combining the plurality of process models.

3. The method of claim 1, further including:
automatically updating the in-memory model of the use case in response to the process model or the selected business process model or both being changed.

4. The method of claim 3, wherein the automatically updating further includes automatically updating the natural language text describing the use case.

5. The method of claim 4, wherein the automatically updating includes one or more of:
transforming an addition of one or more of an activity or a sub-process of the process model into creation of an action in the natural language text of the use case of the in-memory model;
transforming a deletion of an action of the process model into deletion of the action in the natural language text of the use case of the in-memory model;
transforming a deletion of a gateway of the process model into deletion of the action from the text of the use case of the in-memory model;
transforming renaming of an element of the process model by renaming all instances of the element in the natural language text of the use case of the in-memory model; or combinations thereof.

6. The method of claim 1, further including:
automatically retransforming the in-memory model of the use case to an updated process model in response to the in-memory model being changed.

7. The method of claim 1, further including:
repeating the steps of creating and transforming in response to the natural language text being updated.

8. The method of claim 1, wherein the predetermined modeling notation is Business Process Modeling Notation.

9. The method of claim 1, wherein the step of transforming includes:
creating a pool, the pool being initially empty, for each actor in the use case, wherein a start event and one or more end events are associated with said each actor, creating a start event in the pool representing an initiating actor of a first action in the use case and processing each sentence of the use case in sequence to create a flow of activities in the process model;
creating connectors according to a sequence of activities in the in-memory model; and
linking final activity to an end event.

10. The method of claim 9, wherein the step of transforming further includes:
transforming one or more exceptions in the in-memory model into gateway-s of the process model.

11. The method of claim 1, wherein the step of generating a selected business process model includes using def-use analysis of execution paths of the process model.

12. A system for deriving one or more process models from natural language use case models, comprising:
a processor operable to create an in-memory model of a use case from information in natural language text describing the use case, wherein the in-memory model comprises at least an actor node and one or more action nodes comprising an action initiated at least by the actor node, wherein the action of the one or more action nodes has a type comprising at least one of input, output, create, query, update, delete, direct, initiate, and accesschange, the processor further operable to transform the in-memory model into a process model in predetermined modeling notation, wherein the process model comprises at least a start node, an activity node, and a sub-process node, and the processor further operable to generate a selected business process model using the process model; and
a user interface module operable to guide a user to create the in-memory model, generate the selected business process model, edit the natural language text, and edit the selected business process model and edit the in-memory model; and
in response to detecting an addition of a gateway in the generated business process model, the processor further operable to automatically transform the addition into creation of an exception in the natural language text of the use case of the in-memory model,
wherein in response to detecting a change in at least the process model, the processor is further operable to trigger a consistency check among the natural language text of the use case, the in-memory model, the end-to-end business process model, and the changed process model.

13. The system of claim 12, wherein the processor is further operable to automatically update the in-memory model of the use case in response to the process model or the selected business process model or both being changed.

14. The system of claim 13, wherein the processor is further operable to automatically update the natural language text describing the use case.

15. A computer readable storage memory storing a program of instructions executable by a machine to perform a method of deriving one or more process models from natural language use case models, the method comprising:
creating an in-memory model of a use case from information in natural language text describing the use case, wherein the in-memory model comprises at least an actor node and one or more action nodes comprising an action initiated at least by the actor node, wherein the action of the one or more action nodes has a type comprising at least one of input, output, create, query, update, delete, direct, initiate, and access change, the method further comprising transforming the in-memory model into a process model in predetermined modeling notation, wherein the process model comprises at least a start node, an activity node, and a sub-process node, and the method further comprising generating a selected business process model using the process model; and
guiding a user to create an in-memory model, generate the selected business process model, edit the natural language text, and edit the selected business process model and edit the in-memory model; and in response to detecting an addition of a gateway in the generated business process model, the method further comprising automatically transforming the addition into creation of an exception in the natural language text of the use case of the in-memory model, wherein in response to detecting a change in at least the process model, the method further comprising triggering a consistency check among the natural language text of the use case, the in-memory model, the end-to-end business process model, and the changed process model.

16. The computer readable storage memory of claim 15, wherein a plurality of process models are transformed from a plurality of in-memory models, and the generation of business process model includes selectively combining the plurality of process models.

17. The computer readable storage memory of claim 15, further including:

automatically updating the in-memory model of the use case in response to the process model or the selected business process model or both being changed.

18. The computer readable storage memory of claim 17, wherein the automatically updating further includes automatically updating the natural language text describing the use case.

19. The computer readable storage memory of claim 18, wherein the automatically updating includes one or more of:

transforming an addition of one or more of an activity or a sub-process of the process model into creation of an action in the natural language text of the use case of the in-memory model;

transforming a deletion of an action of the process model into deletion of the action in the natural language text of the use case of the in-memory model;

transforming a deletion of a gateway of the process model into deletion of the action from the text of the use case of the in-memory model;

transforming renaming of an element of the process model by renaming all instances of the element in the natural language text of the use case of the in-memory model; or combinations thereof.

20. The computer readable storage memory of claim 15, further including:

automatically retransforming the in-memory model of the use case to an updated process model in response to the in-memory model being changed.

21. The computer readable storage memory of claim 20, wherein the step of transforming further includes:

transforming one or more exceptions in the in-memory model into gateway-s of the process model.

22. The computer readable storage memory of claim 20, wherein the step of generating a selected business process model includes using def-use analysis of execution paths of the process model.

23. The computer readable storage memory of claim 15, further including:

repeating the steps of creating and transforming in response to the natural language text being updated.

24. The computer readable storage memory of claim 15, wherein the step of transforming includes:

creating a pool, the pool being initially empty, for each actor in the use case, wherein a start event and one or more end events are associated with said each actor, creating a start event in the pool representing an initiating actor of a first action in the use case and processing each sentence of the use case in sequence to create a flow of activities in the process model;

creating connectors according to a sequence of activities in the in-memory model; and linking final activity to an end event.

* * * * *